US012646878B2

(12) United States Patent
Fuehrer

(10) Patent No.: US 12,646,878 B2
(45) Date of Patent: Jun. 2, 2026

(54) CONTACT ASSEMBLY FOR AN ELECTRICAL PLUG-IN CONNECTOR HAVING A HEAT CAPACITY ELEMENT ARRANGED ON A CONTACT ELEMENT

(71) Applicant: PHOENIX CONTACT E-Mobility GmbH, Schieder-Schwalenberg (DE)

(72) Inventor: Thomas Fuehrer, Blomberg (DE)

(73) Assignee: PHOENIX CONTACT E-MOBILITY GMBH

( * ) Notice: Subject to any disclaimer, the term of this patent is extended or adjusted under 35 U.S.C. 154(b) by 275 days.

(21) Appl. No.: 18/489,020

(22) Filed: Oct. 18, 2023

(65) Prior Publication Data

US 2024/0136748 A1 Apr. 25, 2024
US 2024/0235084 A9 Jul. 11, 2024

(30) Foreign Application Priority Data

Oct. 24, 2022 (BE) .................................. 2022/5856

(51) Int. Cl.
*H01R 13/639* (2006.01)
*B60L 53/16* (2019.01)
*H01R 13/05* (2006.01)

(52) U.S. Cl.
CPC ............ *H01R 13/052* (2013.01); *B60L 53/16* (2019.02); *H01R 13/639* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 10,535,940 B2 * | 1/2020 | Fuehrer | .................. B60L 53/16 |
| 10,756,498 B1 | 8/2020 | Sarraf | |
| 2014/0087231 A1 | 3/2014 | Schaefer et al. | |
| 2019/0074620 A1 | 3/2019 | Moseke | |
| 2019/0109409 A1 | 4/2019 | Fuehrer et al. | |
| 2021/0063097 A1 | 3/2021 | Hitchcock et al. | |

FOREIGN PATENT DOCUMENTS

| | | | | |
|---|---|---|---|---|
| DE | 102016105308 A1 | 9/2017 | | |
| DE | 102016107409 A1 | 10/2017 | | |
| DE | 102020118120 A1 * | 2/2021 | ............ | B60L 53/302 |
| DE | 102020103128 A1 * | 8/2021 | .............. | B60L 53/16 |
| EP | 3793038 A1 | 3/2021 | | |

* cited by examiner

*Primary Examiner* — Tho D Ta

(74) *Attorney, Agent, or Firm* — LEYDIG, VOIT & MAYER, LTD.

(57) ABSTRACT

A contact assembly for an electrical plug-in connector includes: at least one contact element having a first end region for connection to a corresponding plug-in connector, and a second end region, which faces away from the first end region and for connection to a load line; a heat capacity element arrangeable on the at least one contact element at least in regions; and an insulating material arrangeable in a region between the heat capacity element and the at least one contact element for electrically isolating the heat capacity element from the at least one contact element.

20 Claims, 3 Drawing Sheets

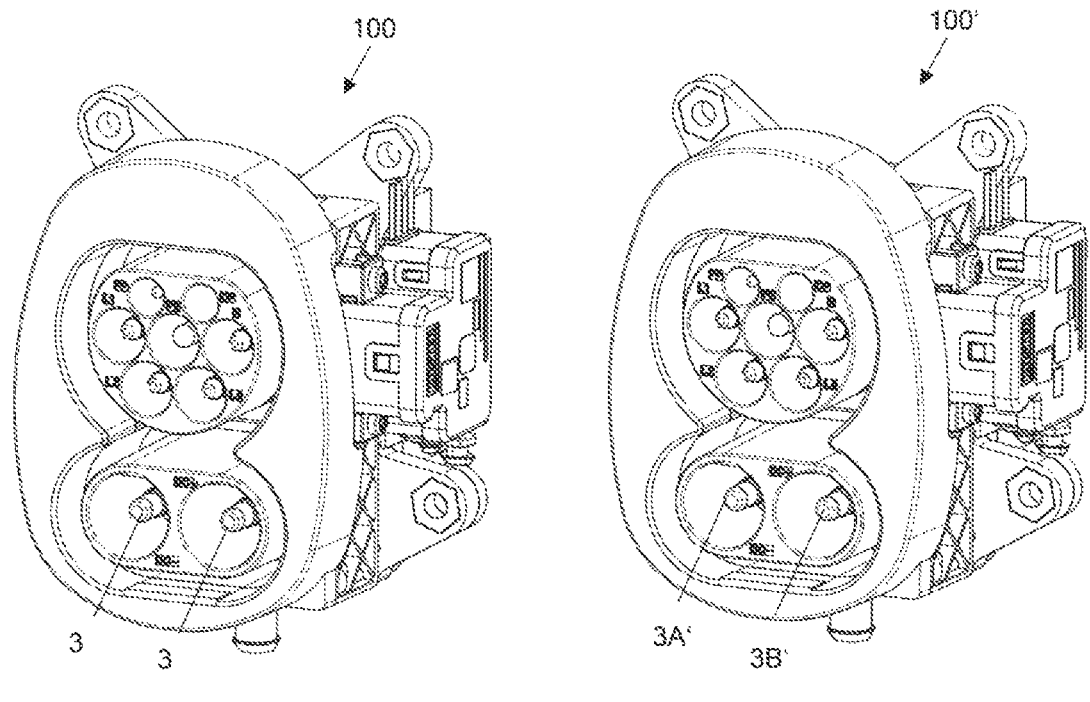
Figure 4C                  Figure 4D

CONTACT ASSEMBLY FOR AN ELECTRICAL PLUG-IN CONNECTOR HAVING A HEAT CAPACITY ELEMENT ARRANGED ON A CONTACT ELEMENT

CROSS-REFERENCE TO PRIOR APPLICATION

Priority is claimed to Belgian Patent Application No. BE 2022/5856, filed on Oct. 24, 2022, the entire disclosure of which is hereby incorporated by reference herein.

FIELD

The invention relates to a contact assembly for an electrical plug-in connector and an electrical plug-in connector, in particular a plug-in charging connector of a charging device for charging an electric vehicle.

BACKGROUND

Such a contact assembly for an electrical plug-in connector has a contact element having a first end region that is formed to connect to a corresponding plug-in connector. The contact element has a second end region facing away from the first end region, which is formed to be connectable to a load line. The contact assembly has a heat capacity element that is arrangeable on the at least one contact element at least in some regions.

Particularly in the field of e-mobility, the highest demands with respect to current-carrying capacity and the associated thermal loads exist for plug-in connector parts and associated cable sets. As well as the cables, the plug-in connectors are regularly exposed to high charging currents, for example of 800 amps and more. Such high currents are to be transmitted with as little power loss as possible. The power dissipation increases quadratically with the current.

For fast charging with direct current, charging times are often between 10 and 30 minutes, and such charging times are expected to shorten further in the future. Due to the large masses of the current-carrying parts, the heating curves are so pronounced that the equilibrium temperature is sometimes only reached after several minutes, even with higher currents. The normative specification is that no component within the plug-in connection may experience a temperature increase of more than 50 kelvin at any time during charging. Due to the normative definition of the plug-in connectors in the field of e-mobility, it is not possible to scale the geometries of the contact elements in order to realize a higher current-carrying capacity and a lower temperature increase. Instead, existing standardized plug-in connector geometries are to be used to achieve the greatest possible power transmissions while at the same time making the joulean heat generated in the plug-in connector controllable.

Until now this has often been successfully achieved with actively cooled plug-in connectors and charging cables. However, the technical effort that usually has to be expended for this is reflected in the costs and effort required to manufacture the actively cooled components of the corresponding charging equipment. DE 10 2016 107 409 A1 proposes, for example, a plug-in connector with active cooling.

Documents DE 10 2016 105 308 A1 and U.S. Pat. No. 10,535,940 B2 describe contact assemblies with contact elements on which heat capacity elements are arranged. Such heat capacity elements are thermally and also electrically conductively connected to the contact elements, as is usual in the prior art.

The heat capacity elements are often formed from materials that are both thermally and electrically conductive. Metals or graphite-based materials are often used for this purpose.

However, connecting heat capacity elements known from the prior art to contact elements is often complex because the heat capacity elements used are often part of the current path and must be electrically insulated from adjacent components, such as adjacent heat capacity elements on adjacent contact elements.

SUMMARY

In an embodiment, the present invention provides a contact assembly for an electrical plug-in connector, comprising: at least one contact element having a first end region, which is configured for connection to a corresponding plug-in connector, and a second end region, which faces away from the first end region and is configured for connection to a load line; a heat capacity element arrangeable on the at least one contact element at least in regions; and an insulating material arrangeable in a region between the heat capacity element and the at least one contact element for electrically isolating the heat capacity element from the at least one contact element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 4A-4D show schematic views of an electrical plug-in connector according to embodiments of the invention.

DETAILED DESCRIPTION

Figures 1A, 1B, 2A, 2B, 3A, 3B:
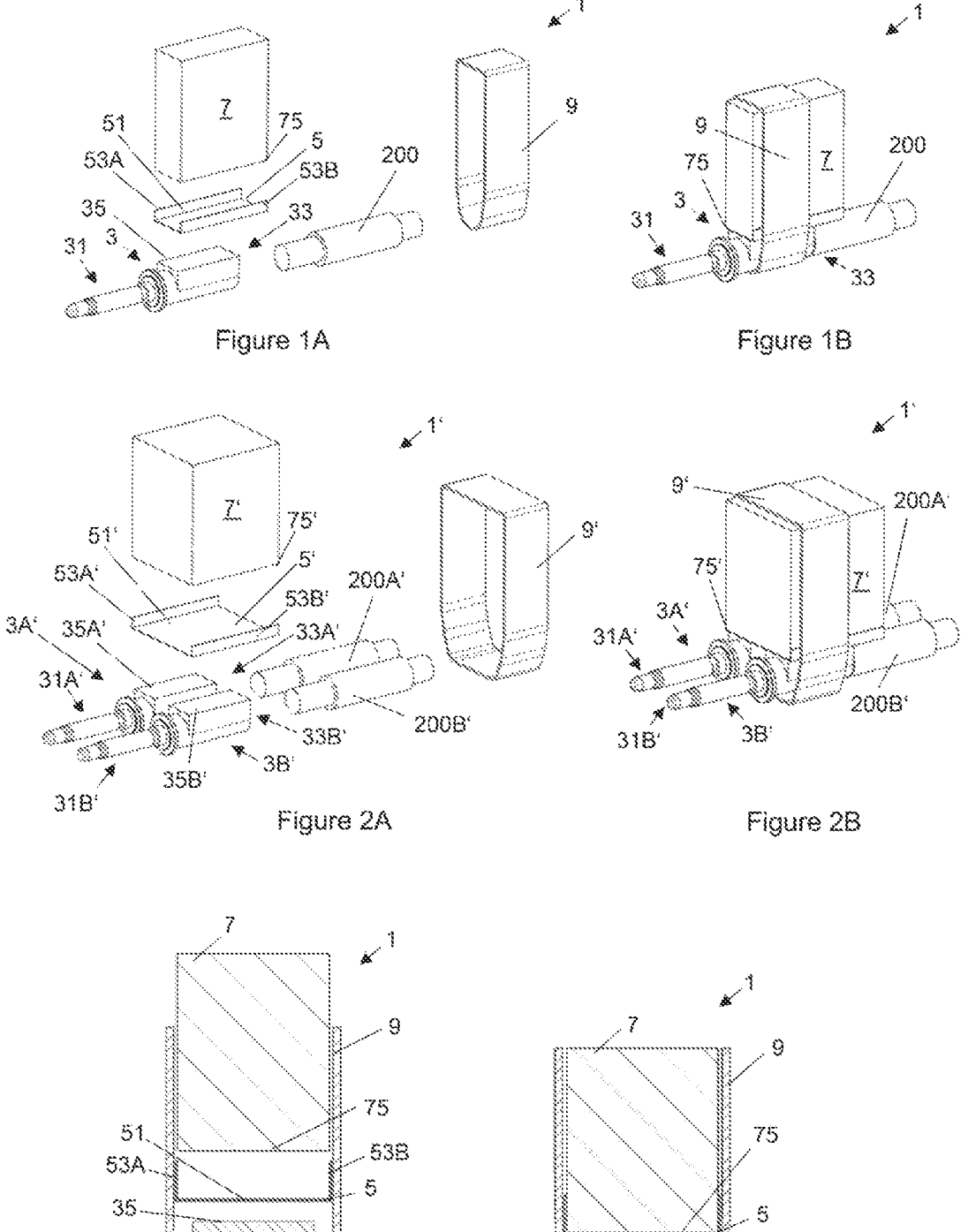
FIGS. 1A, 1B, show schematic views of a contact assembly according to a first embodiment.
FIGS. 2A, 2B show schematic views of a contact assembly according to a second embodiment.
FIGS. 3A-3D show schematic sectional views through connecting surfaces according to embodiments of the invention.

In an embodiment, the present invention provides a contact assembly with which a great amount of heat generated by a current flowing through the contact element can be dissipated via a heat capacity element on a contact element, and which at the same time enables a simple and space-saving structure.

Accordingly, the contact assembly for an electrical plug-in connector has at least one contact element having a first end region that is formed to connect to a corresponding plug-in connector and a second end region opposite the first end region that is formed to connect to a load line. Moreover, the contact assembly has a heat capacity element that is arrangeable on the at least one contact element at least in some regions. In addition, the contact assembly has an insulating material that is arrangeable in a region between the heat capacity element and the at least one contact element in order to electrically insulate the heat capacity element from the at least one contact element.

In the case of the contact assembly, the heat capacity element is arranged on the at least one contact element by indirectly arranging the heat capacity element on the assigned at least one contact element with an intermediate layer formed by the insulating material and connecting the heat capacity element to the contact element thereby. In the installed position, the insulating material thus occupies an intermediate layer between the contact element and the heat capacity element, such that the heat capacity element is thermally coupled to the contact element via the insulating material but is electrically isolated from the contact element.

The at least one contact element may be formed in one piece or in several pieces from a conductive material and have a cylindrical cross-section at least in some regions. The first end region may be formed as a contact pin or a contact socket for connection to a corresponding contact socket or a corresponding contact pin of a corresponding plug-in connector. The second end region may have a receptacle to which an electrical lead designed as a load lead may be connected. For example, the contact element may be designed to transmit electrical currents greater than 300 A, for example up to 800 A.

For arranging the heat capacity element on the contact element, the heat capacity element may have a connecting surface, which may be configured to substantially correspond to a connecting surface of the contact element that extends at least in some regions between the first end region and the second end region of the contact element. For example, the heat capacity element may be held against the contact element by means of a retaining element, such as a resilient tensioning element or a clamping part. The heat capacity element may be block-shaped and formed in one piece from a metal or graphite-based material. The heat capacity element may have or be formed from a phase-change material. The heat capacity element may be formed from a single material or from a plurality of different materials. The heat capacity element is designed to absorb heat from the contact element. The heat capacity element is thermally connected to the contact element via the insulating material, such that heat from the contact element can flow into the heat capacity element and be absorbed there. This is based on the idea of providing an electrical plug-in connector with an increased heat capacity, on the basis of which the heating of the electrical plug-in connector, in particular of the contact element of the electrical plug-in connector, may at least be slowed down. This may be useful, for example, in an electrical plug-in connector for a charging device for charging an electric vehicle and effectively prevent excessive heating in such a charging device.

The contact assembly has an insulating material, which is arrangeable in a region between the heat capacity element and the at least one contact element and configured to electrically insulate the heat capacity element from the at least one contact element while still providing effective thermal coupling. The insulating material preferably is interposed over the full area between the contact element and the heat capacity element, such that the contact element and the heat capacity element are not in direct contact and are electrically isolated from one another by the insulating material.

In the assembled position, the heat capacity element is arranged at least in some regions on the at least one contact element and the insulating material is arranged in a region between the heat capacity element and the at least one contact element for electrically isolating the heat capacity element from the at least one contact element.

The insulating material is configured to be electrically isolating, but thermally conductive. For this purpose, the insulating material preferably has a sufficiently high electrical resistance and a sufficiently low thermal resistance. Advantageously, by arranging the heat capacity element by means of an insulating material on the contact element, heat generated can be well dissipated with reliable, breakdown-resistant electrical isolation of the heat capacity element from the assigned contact element.

In one embodiment, the contact assembly has at least two contact elements, wherein the heat capacity element is arrangeable on the at least two contact elements together and the insulating material is arrangeable on the at least two contact elements between the heat capacity element and the at least two contact elements. In the installed position, the heat capacity element simultaneously abuts the contact elements, with interposition of the insulating material which electrically separates the heat capacity element from the contact elements, but thermally connects it to the contact elements.

For example, one surface of the insulating material may extend over two adjacent contact elements, and a one-piece or integrally formed heat capacity element may be arranged on the two contact elements.

By electrically isolating the heat capacity element from the contact elements via the insulating material, a single heat capacity element may be used together with at least two contact elements. This eliminates the need for two separate heat capacity elements, which in turn would have to be electrically isolated from one another. In this way, a compact design, with good heat absorption and dissipation via the heat capacity element, can be achieved.

In one embodiment, the insulating material is formed as a film, in particular a polyimide film, wherein the film has a material thickness in a range from 0.01 mm to 0.1 mm, in particular in a range from 0.02 mm to 0.08 mm.

Such a film may be easily processed and can be arranged as an intermediate layer between the at least one contact element and the heat capacity element. Due to the high electrical insulating capacity of such a film, its thickness may be selected to be so small that its thermal resistance is low. In particular, material thicknesses of a few hundredths of a millimeter may be realized by such a film, with a simultaneous electrical dielectric strength of several kilovolts. If necessary, the film may be provided with at least one functional coating in order to achieve improved adaptation to its intended use.

In one embodiment, the insulating material has a thermal conductivity in a range of 0.1 W/(mK) to 0.3 W/(mK), in particular 0.2 W/(mK).

In one embodiment, the film has at least one adhesive layer, wherein the adhesive layer is arranged on at least one side of the film, in particular over the entire surface. Advantageously, the heat transfer coefficient can be improved by bonding the films to the at least one contact element and/or the heat capacity element.

In one embodiment, the film is tubular and extends around the at least one contact element at least in some regions. The tubular film may also be used to easily and reliably electrically isolate heat capacity elements with connecting surfaces that are not formed flat, for example with cylindrical connecting surfaces.

In one embodiment, the insulating material is formed in layers with a thermal conductivity of up to 5 W/(mK), and in particular comprises a silicone rubber material. For example, the insulating material may be formed as a blank from a flat material. Advantageously, a thermal conductivity of up to 5 W/(mK) can be achieved with a silicone rubber material.

In one embodiment, the insulating material is formed as an injection-molded part made of a thermally conductive thermoplastic. Advantageously, the injection-molded part may be formed with any contour, such as a flat, tubular or other three-dimensional structure.

In one embodiment, the insulating material is arranged as a coating, in particular a paint or powder coating, between the at least two contact elements and the heat capacity element. The insulating material may be applied to the at least one contact element and/or the heat capacity element. Very thin layers can be realized by a coating, and even elements with complex geometries can be reliably electrically isolated from one another.

In one embodiment, the contact assembly has a retaining element that is arrangeable at least in some regions on the heat capacity element and the at least one contact element and is adapted to retain the heat capacity element on the at least one contact element. For example, in the installed position, the retaining element may extend around the at least one contact element and the heat capacity element in a belt-like manner. The retaining element may, for example, be made of an elastically resilient material and brace the heat capacity element against the at least one contact element, such that the heat capacity element abuts the at least one contact element under elastic pretension.

The retaining element can thus serve as a clamping means and enable a permanent connection between the contact element and the heat capacity element by providing a sufficient clamping force. This enables the heat capacity element to take up a firm seating on the contact element. Furthermore, the application of force to the heat capacity element can ensure a firm seating even when vibrations are applied from the outside.

In one embodiment, the at least one contact element has a first connecting surface formed at the second end region, and the heat capacity element has a second connecting surface corresponding to the first connecting surface, wherein the insulating material is arrangeable between the first connecting surface and the second connecting surface. Advantageously, a stable connection may be created between the at least one contact element and the heat capacity element by means of connecting surfaces configured to correspond to one another. In particular, the first connecting surface may be shaped in a manner complementary to the second connecting surface, such that the first connecting surface and the second connecting surface may abut flat against one another—with the insulating material interposed.

In one embodiment, the first connecting surface and second connecting surface are formed to be flat or curved.

In one embodiment, the first connecting surface and second connecting surface are formed to be cylindrical, wherein the at least one contact element has a second end region that engages in an opening of the heat capacity element.

In one embodiment, the insulating material is formed by a trough-shaped element having a base and upstands extending at the base. With the upstands, the trough-shaped element may in particular encompass edges of the heat capacity element and thus extend into a region of the heat capacity element that does not (directly) face the assigned contact element. The trough-shaped design can increase an isolation distance and improve dielectric strength, in particular against a surface puncture.

In one embodiment, the heat capacity element comprises a phase-change material and/or a metal, in particular copper or aluminum.

The heat capacity element may be made of a metallic material, such as copper or aluminum, in order to provide a large heat capacity and good thermal conductivity.

Alternatively, the heat capacity element may be made of or comprise a phase-change material. A phase-change material is defined herein as a material that can store large amounts of heat at a constant temperature and comparatively small volumes during a phase change from solid to liquid. For example, the phase-change material may be a composite of graphite and kerosene.

By using a phase-change material, a high volume-related energy storage density may be achieved.

In one embodiment, the heat capacity element has a solid, cuboid body.

Advantageously, a large heat capacity may be achieved by such a design. In a further advantageous embodiment, cooling fins may also be arranged on the heat capacity element, via which heat can be emitted to the environment.

Furthermore, the invention relates to an electrical plug-in connector, in particular a charging connector of a charging device for charging an electric vehicle, having at least one contact assembly described herein.

In one embodiment, the electrical plug-in connector has two contact assemblies, each having a contact element and a heat capacity element. In another embodiment, the electrical plug-in connector has a contact assembly having two contact elements and a heat capacity element commonly assigned to the contact elements.

FIG. 1A shows an exploded view of a contact assembly 1, i.e. before arrangement of the heat capacity element 7 on the contact element 3, according to a first embodiment. The contact element 3 shown is designed as a pin contact and has a first end region 31 for connection to a corresponding socket of a corresponding plug-in connector. The second end region 33 facing away from the first end region 31 is connectable to a load line 200.

In the embodiment shown, the contact element 3 has a connecting surface 35 between the first end region 31 and the second end region 33, which is configured to correspond to a connecting surface 75 of the heat capacity element 7. Different embodiments for corresponding connecting surfaces are shown in FIGS. 3A-3D.

In addition, in the embodiment shown in FIGS. 1A and 1B, the insulating material 5 is arrangeable between the heat capacity element 7 and the contact element 3, for electrically isolating the heat capacity element 7 from the at least one contact element 3. In the assembled position of the contact assembly 1 shown in FIG. 1B, a first side of the insulating material 5 is in connection with, or rests on, the connecting surface 35 of the contact element 3, and a second side of the insulating material 5, opposite the first side, is in connection with, or rests on, a connecting surface 75 of the heat capacity element 7. In the embodiment shown, the insulating material 5 is formed by a trough-shaped element having a base 51 and upstands 53A, 53B extended at the base 51, in order to thereby provide security against slippage and good isolation of the edge regions of the heat capacity element 7. In the embodiment shown, the base 51 is formed to be flat and the two upstands 53A, 53B each enclose a right angle with the base 51. In the embodiment shown, the upstands 53A, 53B extend parallel to the respective side surfaces of the block-shaped heat capacity element. In alternative embodiments, the insulating material may also have regions that are angled in the direction of the contact element, or are formed to be flat, i.e. planar.

In the embodiment shown in FIGS. 1A and 1B, a retaining element 9 is also illustrated, which is arrangeable at least in regions around the contact element 3 and the heat capacity element 7, for retaining the heat capacity element 7 in relation to the contact element 3. In the embodiment shown, the retaining element 9 is configured in the form of a belt as a continuous band made of an elastically resilient material, which may be pushed over the heat capacity element 7 and the contact element 3 in the direction in which the contact element 3 extends, in order to brace the heat capacity element 7 against the contact element 3, such that the heat capacity element 7 abuts the at least one contact element 3 under elastic pretension. In the embodiment shown, the geometry of the retaining element 9 is already adapted to the outer surfaces of the heat capacity element 7 and the contact element 3 to be surrounded.

FIG. 1B shows the embodiment of the contact assembly 1 of FIG. 1A in the installed position. In the installed position, the contact element 3 is connected to the load line 200 and the heat capacity element 7 is arranged on the contact element 3. Insulating material 5 for electrically isolating heat capacity element 7 from at least one contact element 3 is arranged between the heat capacity element 7 and the contact element 3.

FIG. 1B further shows that the heat capacity element 7 projects beyond the second end region 33 of the contact element 3. This also enables heat to be selectively absorbed and dissipated at the end region of the load line 200.

FIG. 2A shows an exploded view of a contact assembly 1', i.e. before arrangement of the heat capacity element 7' on the contact elements 3A', 3B', according to a second embodiment.

The contact assembly 1' shown differs from the contact assembly 1 previously shown in FIGS. 1A and 1B in that the contact assembly 1' is of two-pole design, i.e. comprises two contact elements 3A', 3B'. The contact elements 3A', 3B' shown are of the same design and may correspond to the contact element 3 already illustrated in FIGS. 1A and 1B.

Furthermore, the insulating material 5' is shown to extend over the two adjacent contact elements 3A', 3B'. In particular, in the embodiment shown, the flat-formed base 51' extends over both connecting surfaces 35A', 35B' of the contact elements 3A', 3B'. For this purpose, the insulating material 5' of the embodiment illustrated in FIGS. 2A and 2B is formed wider than the insulating material 5 of the embodiment shown in FIGS. 1A and 1B. In the installed position shown in FIG. 2B, a first side of the insulating material 5' is in contact with, or rests on, the two connecting surfaces 35A', 35B' of the contact elements 3A', 3B', and a second side of the insulating material 5', opposite to the first side, is in contact with, or rests on, the connecting surface 75' of the heat capacity element 7'.

In addition, in the embodiment shown in FIG. 2B, the retaining element 9 is also designed in the form of a belt as a continuous band made of an elastically resilient material and may be pushed over the heat capacity element 7' and the contact elements 3A', 3B' in the direction in which the contact elements 3A', 3B' extend, in order to brace the heat capacity element 7' against the two contact elements 3A', 3B'.

FIGS. 3A-3D show sectional views in each case of corresponding connecting surfaces 35, 75.

FIG. 3A shows a sectional view through the contact assembly 1 shown in FIG. 1A. In the example shown, the connecting surface 35 on the contact element 3 and the connecting surface 75 on the heat capacity element 7 are designed to be correspondingly flat (planar). The two connecting surfaces 35, 75 may each be used to contact one side of the insulating material 5 over its entire surface, thereby achieving good thermal conductivity. As already illustrated in FIGS. 1A and 1B and illustrated in detail in FIG. 3A, the insulating material 5 is formed by a trough-shaped element having a base 51 and upstands 53A, 53B extended at the base 51.

FIG. 3B shows a sectional view through the contact assembly 1 shown in FIG. 1A in the installed position. As shown in FIG. 3B, in the embodiment illustrated, the heat capacity element 7 is braced against the contact element 3 in the installed position by the belt-shaped retaining element 9.

Figure 3C:
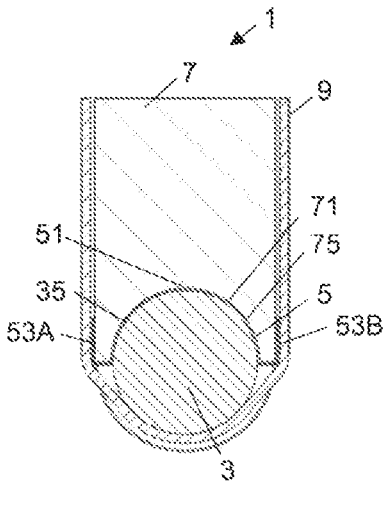

FIG. 3C shows a sectional view through an embodiment of a contact assembly 1 with cylindrically formed corresponding connecting surfaces 35, 75. In the embodiment shown, the contact element 3 engages with the second end region in a cylindrically configured opening 71 of the heat capacity element 7. In the embodiment shown, the insulating material 5 is also configured to be cylindrical in a region of the base 51 that, in the assembled state, lies between the cylindrically configured connecting surfaces 35, 75. In the embodiment shown, the upstands 53A, 53B extending at the base are parallel to the respective side surfaces of the heat capacity element 7. Furthermore, shown in FIG. 3C is a belt-shaped retaining element 9 for bracing the heat capacity element 7 against the contact element 3 in the embodiment shown.

Figure 3D:
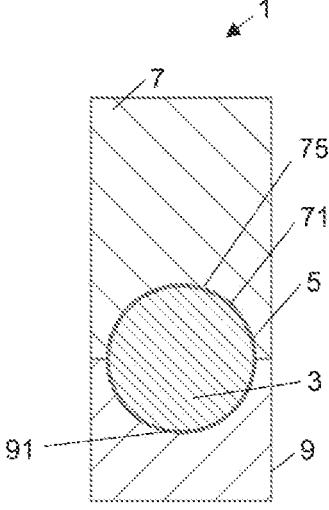

FIG. 3D shows a sectional view through a further embodiment of a contact assembly 1, which is configured similar to the embodiment shown in FIG. 3C. Instead of an insulating material 5 that is formed to be cylindrical in regions, in the embodiment shown in FIG. 3D, the insulating material 5 is shown as a film formed in a tubular shape, which extends around at least a section of the contact element 3. In the embodiment shown in FIG. 3C, the retaining element 9 is designed as a clamping part. Like the heat capacity element 7 in the embodiment shown in FIG. 3D, the clamping part has a cylindrically shaped opening 91, such that the contact element 3 engages in the cylindrically shaped opening 91. In the embodiment shown, the second section of the contact element 3 is interposed over the full area between the cylindrically shaped openings 71, 91 of the heat capacity element 7 and the retaining element 9, which is designed as a clamping part, or is clamped between the heat capacity element 7 and the retaining element 9.

In the embodiment shown in FIG. 3D, the retaining element is formed from the same material as the heat capacity element 7 and is therefore also designed to absorb heat from the contact element 3.

The retaining element 9, designed as a clamping part, is connected to the heat capacity element by means of at least one connecting element, which in embodiments is realized as at least one screw, which extends through a through-hole in the material of the retaining element 9, in order to work together with a corresponding thread in an opening of the heat capacity element 7. Screwing in the screw braces the retaining element 9, which is designed as a clamping part, against the heat capacity element 7.

FIGS. 4A to 4D show schematic views of an electrical plug-in connector 100, 100' with contact assemblies 1, 1' according to embodiments of the invention. The plug-in connector 100, 100' is illustrated as a plug-in charging connector of a charging device for charging an electric vehicle. Specifically, the plug-in charging connector is illustrated as a combined charging system (CCS) connector, which may also be referred to as a Combo connector.

As shown, the plug-in charging connector is divided into two regions: The upper part corresponds to a so-called Type 2 connector. The lower part is used for electrical charging with direct current.

Figure 4A:
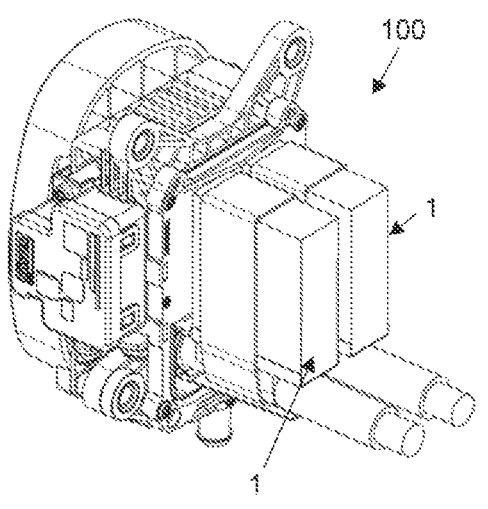
Figure 4B:
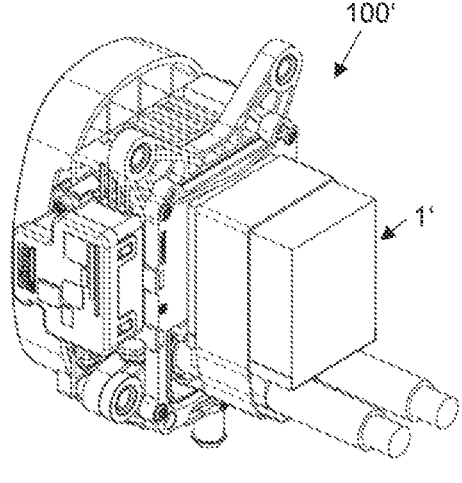

In the lower part, in the embodiment shown in FIGS. 4A and 4C, two single-pole contact assemblies 1 may be used according to the embodiment illustrated in FIGS. 1A, 1B. Alternatively, a two-pole contact assembly 1' according to the embodiment illustrated in FIGS. 2A and 2B may be used in the lower part as shown in the embodiment illustrated in FIGS. 4B and 4D.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1, 1' Contact assembly
3, 3A', 3B' Contact element
31, 31A', 31B' First end region
33, 33A', 33B' Second end region
35, 35A', 35B', 75 Connecting surface
5, 5' Insulating material
51, 51' Base
53A, 53A', 53B, 53B' Upstand
7, 7' Heat capacity element
71, 91 Opening
9, 9' Retaining element
100, 100' Electrical plug-in connector
200, 200A', 200B' Load line

The invention claimed is:

1. A contact assembly for an electrical plug-in connector, comprising:

at least one contact element having a first end region, which is configured for connection to a corresponding plug-in connector, and a second end region, which faces away from the first end region and is configured for connection to a load line;

a heat capacity element arrangeable on the at least one contact element at least in regions; and an insulating material arrangeable in a region between the heat capacity element and the at least one contact element for electrically isolating the heat capacity element from the at least one contact element.

2. The contact assembly of claim 1, wherein the at least one contact element comprises at least two contact elements, and wherein the heat capacity element is arrangeable simultaneously on the at least two contact elements, and the insulating material is arrangeable on the at least two contact elements between the heat capacity element and the at least two contact elements.

3. The contact assembly of claim 1, wherein the insulating material comprises an injection-molded part comprising a thermally conductive thermoplastic.

4. The contact assembly of claim 1, wherein the insulating material is arranged as a coating, comprising a paint or powder coating, between the at least two contact elements and the heat capacity element.

5. The contact assembly of claim 1, wherein the heat capacity element comprises a phase-change material and/or a metal comprising copper or aluminum.

6. The contact assembly of claim 1, wherein the heat capacity element has a solid, cuboid body.

7. An electrical plug-in charging connector of a charging device for charging an electric vehicle, comprising:

at least one contact assembly of claim 1.

8. The contact assembly of claim 1, further comprising:

a retaining element arrangeable at least in regions on the heat capacity element, and on the at least one contact element, wherein the retaining element is configured to retain the heat capacity element on the at least one contact element.

9. The contact assembly of claim 8, wherein the retaining element is extended in a belt-like manner around the at least one contact element and the heat capacity element in the assembled position.

10. The contact assembly of claim 8, wherein the retaining element comprises an elastically resilient material.

11. The contact assembly of claim 1, wherein the at least one contact element has a first connecting surface formed at the second end region and the heat capacity element has a second connecting surface corresponding to the first connecting surface, and wherein the insulating material is arrangeable between the first connecting surface and the second connecting surface.

12. The contact assembly of claim 11, wherein the first connecting surface and the second connecting surface are flat or curved.

13. The contact assembly of claim 11, wherein the first connecting surface and the second connecting surface are cylindrical, and wherein the at least one contact element has a second end region that engages in an opening of the heat capacity element.

14. The contact assembly of claim 11, wherein the insulating material comprises a trough-shaped element having a base and stands up extended at the base.

15. A contact assembly for an electrical plug-in connector, comprising:

at least one contact element having a first end region, which is configured for connection to a corresponding plug-in connector, and a second end region, which faces away from the first end region and is configured for connection to a load line;

a heat capacity element arrangeable on the at least one contact element at least in regions; and an insulating material arrangeable in a region between the heat capacity element and the at least one contact element for electrically isolating the heat capacity element from the at least one contact element, wherein the insulating material comprises a polyimide film, and wherein the polyimide film has a material thickness in a range from 0.02 mm to 0.08 mm.

16. The contact assembly of claim 15, wherein the polyimide film has at least one adhesive layer, and wherein the adhesive layer is arranged on at least one side of the polyimide film, over an entire surface thereof.

17. The contact assembly of claim 15, wherein the polyimide film is tubular and extends around the at least one contact element at least in some regions.

18. The contact assembly of claim 15, wherein the insulating material has a thermal conductivity in a range from 0.1 W/(mK) to 0.3 W/(mK).

19. The contact assembly of claim 18, wherein the thermal conductivity in a range from 0.2 W/(mK) to 0.3 W/(mK).

20. A contact assembly of for an electrical plug-in connector, comprising:

at least one contact element having a first end region, which is configured for connection to a corresponding plug-in connector, and a second end region, which faces away from the first end region and is configured for connection to a load line;

a heat capacity element arrangeable on the at least one contact element at least in regions; and an insulating material arrangeable in a region between the heat capacity element and the at least one contact element for electrically isolating the heat capacity element from the at least one contact element, wherein the insulating material is formed in layers, comprising a silicone rubber material, with a thermal conductivity of up to 5 W/(mK).

\* \* \* \* \*